United States Patent
Khan et al.

(12) 
(10) Patent No.: US 6,614,717 B1
(45) Date of Patent: Sep. 2, 2003

(54) TIME-LAPSE SEISMIC USING NONLINEAR SEISMIC IMAGING

(75) Inventors: Tawassul Ali Khan, Cypress, TX (US); Sofia McGuire, Houston, TX (US)

(73) Assignee: Nonlinear Seismic Imaging, Inc.

( * ) Notice: Subject to any disclaimer, the term of this patent is extended or adjusted under 35 U.S.C. 154(b) by 27 days.

(21) Appl. No.: 09/941,917

(22) Filed: Aug. 30, 2001

(51) Int. Cl.⁷ .............................................. G06F 19/00
(52) U.S. Cl. ......................................... 367/46; 702/17
(58) Field of Search ............................. 367/17, 46, 45, 367/52; 702/17, 14

(56) References Cited

U.S. PATENT DOCUMENTS 5,850,622 A * 12/1998 Vassiliou et al. ............. 702/17
6,021,379 A * 2/2000 Duren et al. ................... 702/16

* cited by examiner

Primary Examiner—Gregory J. Toatley, Jr.
(74) Attorney, Agent, or Firm—Nonlinear Seismic Imaging, Inc.; Tawassual A. Khan; Sofia Khan McGuire (57) ABSTRACT

This invention relates to using elastically nonlinear seismic imaging methods, to identify the bypassed hydrocarbons and the movement of the reservoir fluids in the reservoir due to injection and production processes. Time-lapse seismic recording is used to monitor the changes in the hysteretic nonlinear behavior of the pore fluids in the reservoir rocks. Since the nonlinear hysteretic behavior of the saturated reservoir rock generates harmonics of the primary seismic signal that propagates through it, the measurement of these harmonics is used to determine the changes in the reservoir fluids due to hydrocarbon production over time.

5 Claims, 6 Drawing Sheets

TIME-LAPSE SEISMIC USING NONLINEAR SEISMIC IMAGING

BACKGROUND OF THE INVENTION

1. Field of the Invention

This invention is related to measuring the dynamically changing pore fluid properties of the hydrocarbon reservoir due to injection and production at different time intervals. More specifically, the invention is related to using elastically nonlinear seismic imaging methods to identify the fluid fronts and the bypassed hydrocarbons. The fluid movements, fluid saturation changes, and the temperature variations in the reservoir due to injection and production processes are mapped. The periodic monitoring of the movement of fluids due to drainage and injection enables one to improve the overall production plan and reservoir management.

2. Description of the Related Art

Time-lapse seismic methods have been used during the last ten years, where two-dimensional (2-D) or three-dimensional (3-D) seismic data is recorded at different intervals of time to monitor the changes in seismic character and amplitude. The reservoir monitoring methods, which use surface land seismic, marine seismic or downhole seismic, try to image small changes in the reservoir seismic response from one survey to the next survey. These surveys are recorded at different time intervals.

The time-lapse seismic response quite often is non-unique, since the changes in reflection amplitude and its character can be caused due to various factors. The same seismic response can be caused due to changes in oil saturation, gas-to-oil ratio, pressure variation, temperature changes etc. Reservoir seismic response has many variables, and at present, there are not enough seismic attributes to solve them. To characterize reservoir properties with a higher level of confidence, more seismic attributes in addition to amplitude, attenuation and velocity are needed.

New seismic techniques, which are more sensitive to the changes in the reservoir conditions, have to be developed and introduced to enable one to better interpret the seismic results in terms of petrophysical properties of the reservoir rocks.

Time-lapse seismic, which is also known as 4-D, has a great deal of potential as a reservoir surveillance tool. 4-D can enable one to monitor the changes over time due to fluid movement during hydrocarbon production. It provides an analysis of the hydrocarbon sweep efficiency and can act as a guidline for better reservoir management through out the life of the reservoir. Nonlinear time-lapse seismic integrated with the current imaging technology will overcome the weaknesses that exist due to ambiguity of the results.

In many of the producing fields, unproduced hydrocarbons have been left behind because the industry lacks a technology that will identify the trapped and unproduced hydrocarbons due to the complex geology of the reservoirs. At present the hydrocarbon extraction technologies, in the form of horizontal and multilateral drilling and intelligent well completions, exist. What is lacking is a reliable subsurface imaging method with the required resolution to map the reservoir characteristics, the reservoir fluids and their movement. A seismic technology that will provide reliable information regarding the petrophysical properties of the reservoir rocks and its pore fluids is needed.

SUMMARY OF THE INVENTION

This invention provides a new method where measurements of the changes in the elastic nonlinearity of the saturated reservoir rocks are used to detect the changes in the reservoir fluids. Seismic signals transmitted from the surface or from the wellbore, and recorded at the surface, wellbore or both, are analyzed to determine the elastic nonlinearity of the reservoir rocks due to porosity, permeability, microfractures, and more specifically the pore fluids.

Heterogeneous materials, such as reservoir rocks, have extreme elastically nonlinear behavior due to their structural defects. Large deviations in their nonlinear and hysteretic properties can be caused when the consolidation and/or saturation conditions change in the reservoir. Accurate measurement of the changes in elastic nonlinear properties can be a sensitive measure of the pore fluids and their movement.

In the linear theory of elasticity two elastic waves do not interact, the equations of motion are linear, and the principle of superposition holds. In an elastically nonlinear medium, Westervelt (1963) was the first to show that two collinear high-frequency primary waves could interact to produce acoustic waves with frequencies equal to the sum and difference frequencies of the primaries. Additionally, when a discrete frequency seismic signal or a swept frequency seismic signal is used, there is an interaction with itself. Due to this interaction with itself, the related harmonics are generated as the signal propagates through an elastically nonlinear reservoir formation. The relative amplitudes of the odd and even harmonics that are generated depend on the physical properties of the rock and its pore fluids. Odd or even harmonics at the seismic frequencies may dominate the output spectra. The relative amplitudes of these odd and even harmonics will depend on the viscosity of the pore fluids. The measurement of the changes in the relative amplitudes of these odd and even harmonics caused due to hydrocarbon production over time can be used as a sensitive measure of the fluid changes in the reservoir rock.

Over a period of time, due to hydrocarbon production from a reservoir, there are changes in the pressure distribution, oil water contact, gas/oil ratio, temperature, etc. Seismic sensitivity to these changes that occur due to production and injection, can be used for nonlinear time-lapse seismic, to monitor the bypassed oil, map fluid flow barriers, fluid saturation changes, and for mapping the fluid fronts. The changes in the internal parameters of the reservoir rocks, due to fluid movement, affect the propagation characteristics of the seismic wave as it travels through the reservoir at different time intervals during a production or injection phase. Since the propagation of seismic wave is a coupled motion between rock matrix and pore fluids, its propagation characteristics change according to the changes of the internal parameters in the reservoir. The changes in the viscosity of the reservoir pore fluids make a major contribution in the elastically nonlinear seismic response of the time-lapse seismic recording.

Viscosity is the property of a fluid that tends to prevent it from flowing when subjected to an applied force; high viscosity fluids resist flow while low viscosity fluids flow easily. Because of this effect, the seismic wave propagation characteristics are different during the propagation of the seismic wave through the rocks that have high viscosity pore fluids versus low viscosity pore fluids. During the propagation of a seismic wave through a fluid saturated reservoir rock, viscosity determines the amount of friction and the energy absorbed, which in turn determines the amount of distortion and the type of harmonics generated.

When a seismic wave travels through a sedimentary reservoir rock, the matrix (mineral frame) of the rock is deformed; the pore fluid is compressed, dragged and pressured to flow. Fluids and solids are compressed as if they were individual springs connected together in different configurations. The pore fluids are mobile, so they are squeezed and squirted out of the thin cracks into larger pores as the rock matrix is compressed by the propagation of a seismic wave. The solid/fluid interaction is intimately connected. The viscosity of the pore fluid plays an important part in a solid's oscillatory motion due to viscous friction and inertial coupling. The type of fluid and its viscosity in the pore space and at the grain contacts has a large influence on the rock stiffness. Due to elastic nonlinearity and the pore fluid viscosity, hysteresis is observed in the stress-strain relationship of a reservoir rock when exposed to an oscillatory seismic wave.

Hysteresis is a property of viscoelastic materials and is strongly associated with the pore fluid motion. Hysteresis represents the history dependence of physical systems. If you push on something, it yields: when you release, does it spring back completely? If it does not, it is exhibiting hysteresis. So, if there is a difference in the stress/strain relation between loading and unloading cycles of a rock than it can be categorized as hysteretic. The area of the stress/strain hysteresis loop represents energy dissipation as heat during the load cycle.

When a sinusoidal seismic wave propagates through the reservoir rock, the load is reversed from the compression to the rarefaction cycle of the seismic wave; the pore fluid is rearranged due to the deformation of the rock matrix in a confined space. This causes a lag between stress and strain, determining the size of the hysteresis loop. This phenomenon is dominated by the properties of the pore fluids. Time lag is fluid dependent; long chain fluid molecules give rise to higher time lags. Higher hysteresis at seismic frequencies is related to the higher viscosity of the pore fluids. Oil that has higher viscosity compared to water and gas will display a more pronounced hysteretic behavior to an oscillatory seismic wave, compared to water or natural gas that has lower viscosity. Since the nonlinear hysteretic behavior of the saturated reservoir rock generates harmonics of the primary signal, the measurement of these harmonics can be used as a diagnostic tool for determining the fluid saturation and the type of pore fluids.

The characteristic of the second and other even harmonics is that the primary signal waveform during compression and rarefaction cycles is not identical. So the presence of the even harmonics is indicative that the compression cycle of a sinusoidal seismic wave is different from the rarefaction cycle. The rock behaves differently when it is compressed compared to when the compression is removed.

The third harmonic, on the other hand, is generated when the distortion during compression and rarefaction cycles of the sinusoidal seismic wave is symmetrical. This indicates that the stress/strain relationship at seismic frequencies during compression and rarefaction cycles is similar. This in turn is indicative that the viscosity of the pore fluids is such that the rock is exhibiting less hysteresis. Pore fluids have lower viscosity. Note that these harmonics in consideration are not generated by the vibratory source, but are generated in the earth during the seismic signal propagation through the nonlinear rocks of the reservoir.

Due to the complex nature of the rock composition, we may expect both odd and even harmonics generated when a seismic wave travels through an elastically nonlinear reservoir rock. But, the amplitude of the even harmonics will be greater and dominate when the pore fluids have higher viscosity like oil. The amplitude of the odd harmonics will be more pronounced when we have lower viscosity pore fluids like natural gas. The measurements of the relative amplitudes of the odd and even harmonics of a primary seismic wave (signal) and the differences in their relative amplitudes over time will indicate the changes and the movement of the pore fluids caused due to hydrocarbon production.

When the seismic reflection data are recorded using a vibratory source that transmits a swept frequency signal, the cross-correlation with the transmitted signal provides a primary data set that is free from the harmonics generated by the nonlinearity of the earth. This represents the standard and conventional seismic reflection image being used today in the industry. However, when the same data-set is cross-correlated with different harmonics of the swept frequencies, the result of the cross-correlation is the reflected image of the subsurface which is illuminated with each particular harmonic. Harmonics of the primary swept frequency signal are generated only during the propagation of the primary signal through the reservoir, which is nonlinear due to its porosity and its pore fluids. For this reason, the reflected image created by each harmonic displays only the reservoir and its pore fluids. The formations, which consist of non-porous rocks and do not have any pore fluids, will not be visible and will appear as a non-coherent signal on the seismic reflection image.

The seismic reflection image generated by the result of cross-correlation with the second harmonic will represent the part of the reservoir that is porous and has higher viscosity pore fluids. In the same manner, the result of the cross-correlation with the third harmonic will illuminate the part of the reservoir that is saturated with the lower viscosity fluids.

This invention provides a method of mapping the reservoir fluids and monitoring their movement over a period of time due to production and injection. The measurements of the relative amplitudes of the reflected image of the reservoir mapped by the odd and even harmonics of the primary input signal are used to determine the changes of the reservoir fluids in the reservoir rocks due to hydrocarbon production over a period of time. The dominance of the even harmonics in the reflected seismic signals is indicative of the higher viscosity pore fluids like oil, and the dominance of the odd harmonics indicate presence of the lower viscosity fluids like natural gas. Any changes in the relative amplitudes of the odd or even harmonics, in time-lapse recording, will relate to the changes in the reservoir pore fluids that have taken place due to hydrocarbon production. By mapping and displaying the subsurface seismic reflection image of the reservoir generated by each of the odd and even harmonics and monitoring the changes in their relative amplitudes over time, the movement of the reservoir fluids can be mapped. The method described in this invention is equally applicable for surface seismic recording methods, borehole seismic or any combination of the wellbore and surface seismic.

DESCRIPTION OF THE PREFERRED EMBODIMENT

Figure 1:
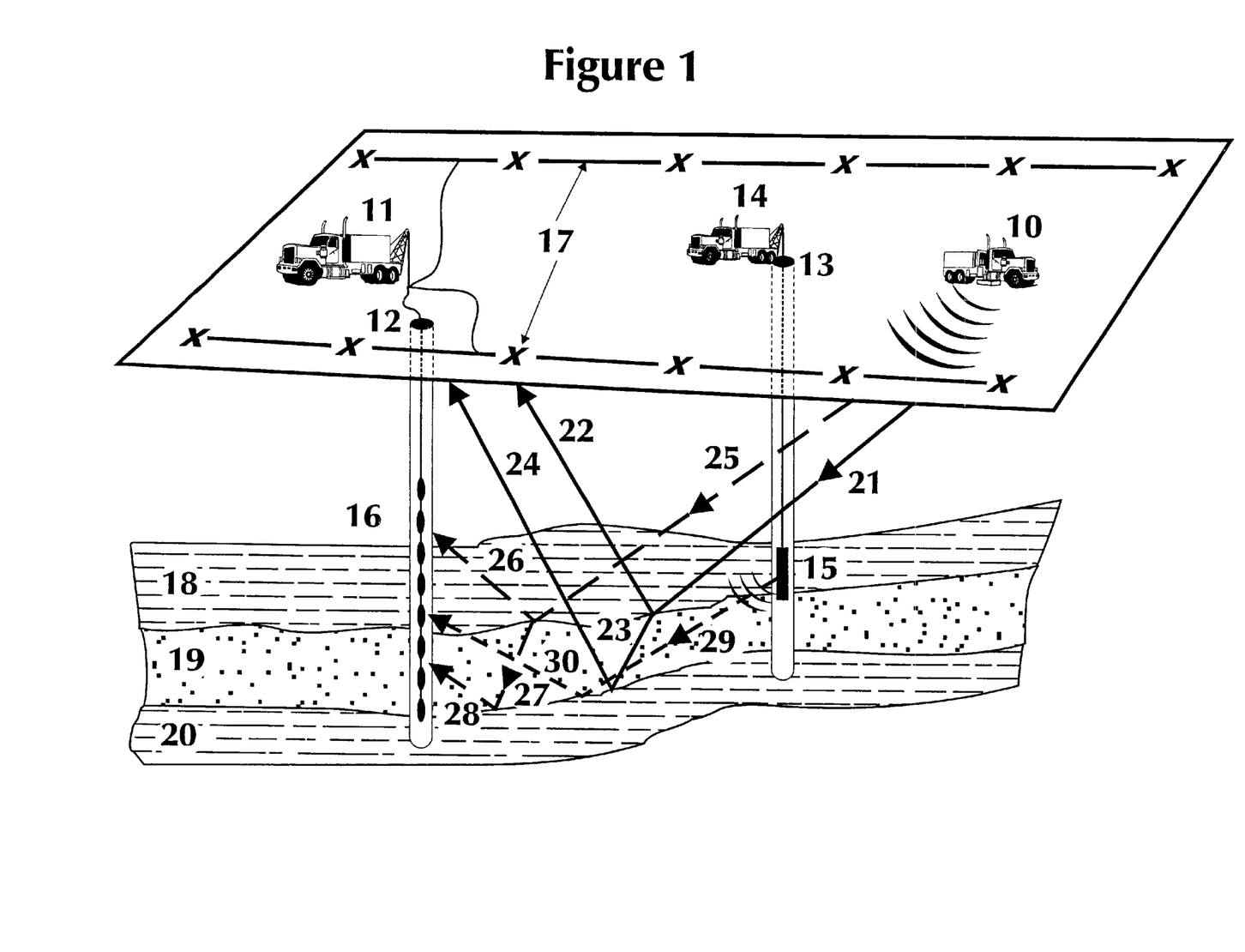
FIG. 1 is a simplified schematic, taken partly in cross section, to illustrate different configurations of the field data acquisition for the invention.

In the drawings, FIG. 1 schematically illustrates the concept of different configurations of seismic field recording methods for this invention. This invention relates to different methods of time-lapse seismic recording, where data are acquired at different time intervals during hydrocarbon production to map the dynamic properties of the reservoir. To improve the production efficiency, usually after the primary recovery, fluids are injected in the reservoir formations to maintain the pressure and to use the injected fluid front to push the hydrocarbons towards the producing wells. It is important that the changes in the reservoir pore fluids can be monitored at different time interval to assess the performance of the production and injection program.

At present, repeat seismic surveys are recorded in time-lapse mode to monitor the changes in the character and amplitude of the reflected signals from the reservoir formations to map the effects of the hydrocarbon production processes. Seismic data are acquired using surface source and surface receivers, surface source and downhole receivers, downhole source and downhole receivers or any combination of these acquisition techniques. In every case, seismic reflection imaging methods are used to monitor the small changes in the seismic reflection response of the reservoir formations to detect the production sweep efficiency of hydrocarbons and map the bypassed oil. Quite often the seismic results of these surveys are not unique and there is certain amount of uncertainty in identifying and interpreting the movement of the reservoir fluids.

This invention analyzes the nonlinear and hysteretic behavior of the fluid-saturated reservoir rocks to the transmission of the seismic waves to identify the presence of oil, water or natural gas in the reservoir formations, and to monitor the changes in the pore fluids due to injection and production processes. FIG. 1 illustrates different methods of seismic reflection recording that can be used for this invention. A surface source 10 that could be a land or marine vibratory source—that is generally known and used in the industry—transmits a swept frequency seismic signal; the swept frequency could be selected according to the subsurface mapping targets.

For this example, a 10 Hz to 50 Hz swept frequency signal is selected, with time duration of 10 seconds. The reflected seismic signals, which are generated due to the reflected energy from the acoustic impedance contrasts, are received by the surface arrays 17, downhole array 16 located in Well 12, or any combination of the two. The received reflected seismic signals are recorded by recording truck 11. The seismic reflection recording of the reservoir formations can also be made using a downhole source 15 located in Well 13; the output of the downhole source 15 is received by the receiver array 16 in Well 12 and/or surface arrays 17. Recording truck 11 is capable of simultaneously recording the data from surface arrays 17 and downhole array 16. This data acquisition, as shown, can be done with the equipment available in the industry and the methods of this type of data acquisition are well known in the industry. Downhole source deployment is done using a standard wire-line instrument truck 14, which can deploy and energize the downhole source 15, according to the known and current art. To take full advantage of the downhole seismic environment, a higher frequency swept signal is used, for instance 100 Hz to 500 Hz swept frequency signal, with time duration of 10 seconds. Basically, FIG. 1 is illustrating that there are many surface and borehole seismic reflection-recording methods that are currently being used, and this invention is equally applicable to all of them.

FIG. 1 shows, in cross section, reservoir formations 18, 19, and 20. Formation 19 is the reservoir rock that has porosity, permeability and pore fluids. The formations 18 and 20 are sealing formations, with little porosity and no permeability. Reservoir rock formation 19 is elastically nonlinear, while 18 and 20 are homogeneous and behave more linearly to the seismic waves that propagate through them. Seismic signals are not distorted as they travel through the elastically linear rock formations 18 and 20; no odd or even harmonics of the primary input signal are generated. On the other hand the same seismic waves, when they propagate through the reservoir formation 19, which is elastically nonlinear, suffer nonlinear wave-form distortion, and odd and even harmonics are generated. The type of odd and even harmonic distortion that is created due to the elastic nonlinearity of the reservoir rock 19, depends on the porosity, permeability, grain structure and the pore fluids. The propagation of the compressional seismic wave deforms the structure of the grains in the reservoir rocks; pore fluids are squirted from the soft portions of the pore space into the stiffer portions. Depending on the viscosity of the pore fluid, this cross-flow during compression and rarefaction cycles of a sinusoidal seismic wave dissipates energy. A hysteretic behavior develops. Higher viscosity pore fluids exhibit larger hysteresis, and even harmonics dominate the spectrum. When the pore fluids, like natural gas or water, are present that have lower viscosity, there is less hysteretic effect due to the cross flow and odd harmonics are more prominent.

In FIG. 1, the seismic wave 21 is generated by the source 10, is reflected as 22 from the interface of formation 18 and 19; it will have relatively none or very small amount of harmonic distortion. On the other hand seismic wave 23 that travels through the elastically nonlinear formation 19 and is reflected from the lower interface of formation 19 and 20, as 24, will exhibit measurable harmonic distortion. The spectrum of the reflected signal 24, will exhibit dominance of odd or even harmonics depending on the viscosity of the pore fluids in the reservoir formation 19. Similarly, seismic waves 25 and 26 will exhibit little distortion, and 27 and 28 will show dominance of odd or even harmonics depending on the viscosity of the reservoir fluid in formation 19. Seismic source 15, which is located in the wellbore 13, transmits a seismic swept frequency signal that travels through the rock as 29, which is recorded by the downhole array 16, located in wellbore 12, will also provide similar results. The measurement of the odd and even harmonic content of the reflected signals from the interface of 19 and 20, will characterize the rock properties of the reservoir formation 19 and its pore fluids.

Figure 2:
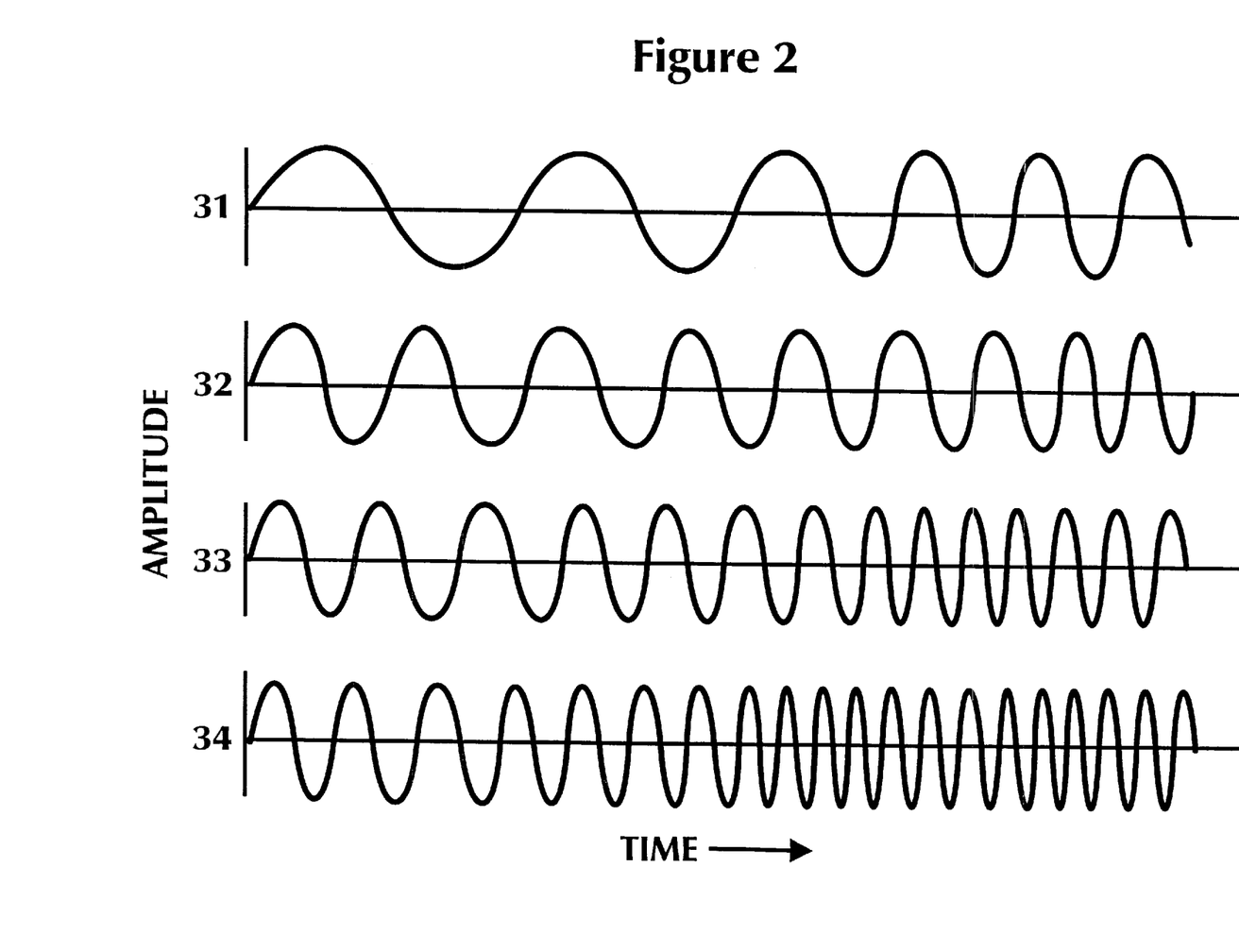
FIG. 2 shows a swept frequency primary seismic signal, and the signals that represent its second, third and fourth harmonics.

FIG. 2 illustrates the primary seismic swept frequency signal 31, transmitted by the source 10 in FIG. 1. Data recorded by the recording truck 11 that represents the reflected signals from the subsurface including the seismic reflections from the interface of the formations 19 and 20 in FIG. 1, is cross-correlated with 31 (10 Hz to 50 Hz sweep)

to provide conventional seismic reflection data (2-D or 3-D) that is currently being used in the industry, and is generally known in the art. However, the same recorded data, when correlated with 32, which is 20 Hz to 100 Hz sweep that has been computer-generated to represent the second harmonic of the primary signal 31, will separate the second harmonic frequency content of the reflected signals from the conventional seismic reflection data. In the same manner cross-correlation of the recorded data with 33 (30 Hz to 150 Hz), which is the computer-generated sweep that represents the third harmonic of the primary signal 31, will only show the third harmonic swept frequency component of the reflected seismic signals generated due to the elastic nonlinearity of the reservoir formation 19 (FIG. 1). Similarly cross-correlation with 34 (40 Hz to 200 Hz sweep) will separate the fourth harmonic component of the seismic reflection data from the reflection of the lower interface of the reservoir formation 19.

In this manner cross-correlation of the recorded data with 31 provides us the conventional primary seismic reflection data set (2-D or 3-D), which is processed for reflection imaging according to the current and accepted art in the industry. The results of the cross-correlation with 32, 33, and 34, extract the second harmonic content, third harmonic content and the fourth harmonic content of the primary seismic reflection data, respectively. The data, which results after cross-correlation with 32, 33, and 34 are processed using identical processing parameters and the data flow that is used for the conventional data set (result of cross-correlation with 31). The relative amplitudes of the respective processed data volume that represents different harmonics in the reflected signals are analyzed to determine the reservoir fluid properties. The changes at different time intervals (4-D) in the relative amplitudes of the reflection data that represents odd or even harmonics in the time-lapse seismic signals from the reservoir formations, relate to the changes in reservoir fluids due to production and injection processes.

Figure 3:
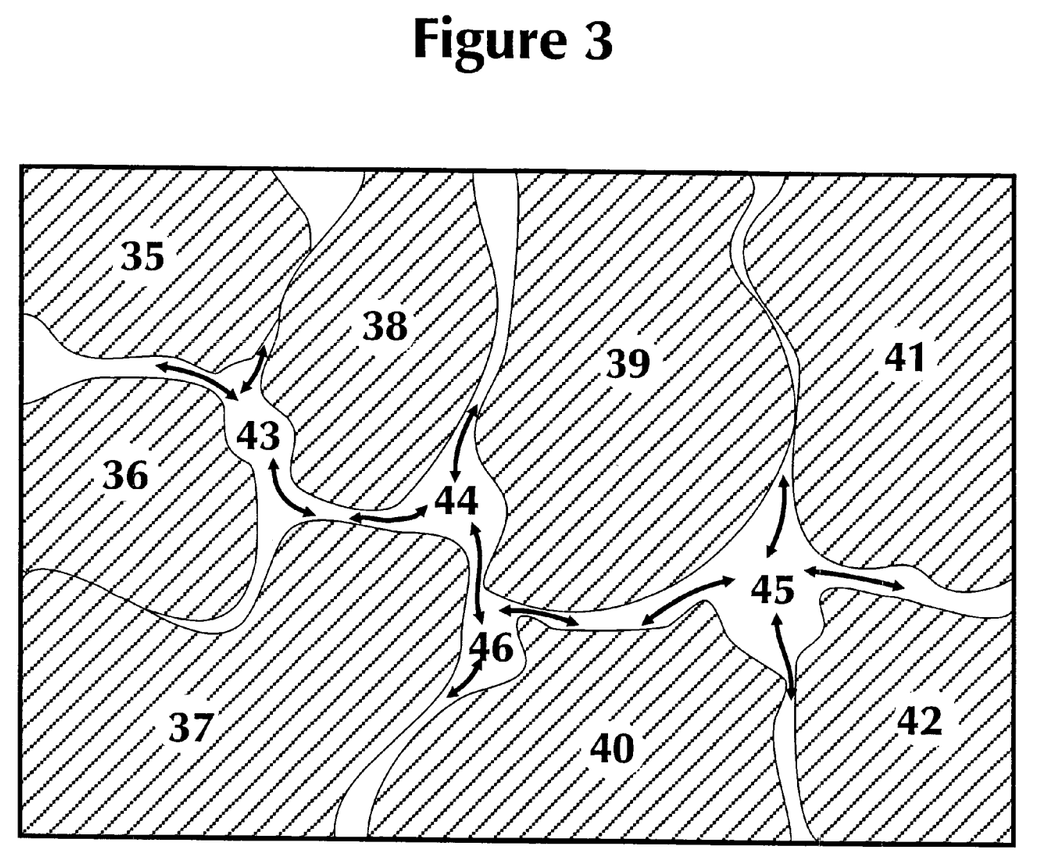
FIG. 3 illustrates the squirt flow of the pore fluids due to deformation of the rock matrix due to compression caused by a propagating seismic wave.

FIG. 3 illustrates the complex structure of the grains in a porous and permeable rock. The grains, 35, 36, 37, 38, 39, 40, 41, and 42 are arranged to have different pore spaces between them, as shown with 43, 44, 45 and 46. During the propagation of a seismic wave that has compression and rarefaction cycles, the grains 35 to 42 are deformed according to the seismic wave cycles. During compressional cycle of the seismic wave, fluid is compressed and is squeezed out of the thinner part of the pore space and moves towards the larger pore space. In rarefaction cycle of the seismic wave, the pore fluid moves back to the thinner part of the pore space. This phenomenon creates an oscillatory motion in the pore fluid, which tends to follow the oscillatory motion of the seismic wave. However, due to the viscosity of the pore fluid, there is viscous friction, which causes hysteresis and time lag. The stress/strain relation in the pore fluid between the compression and the rarefaction cycles of the propagating seismic wave becomes different. This difference is more pronounced with higher viscosity fluid like oil compared to lower viscosity fluid like water or natural gas. Since seismic wave propagation through a reservoir rock—that is porous and permeable, and is fluid saturated—is a coupled motion, any energy loss due to hysteretic effect of the pore fluid will also distort and modify the shape of the seismic wave traveling through the rock frame. Energy loss during the compression cycle of a sinusoidal seismic wave due to viscous friction and hysteresis will distort the primary wave form and will make the shape of the compression cycle of the sinusoidal wave different compared to the rarefaction cycle. Even harmonics will be generated.

Figure 4:
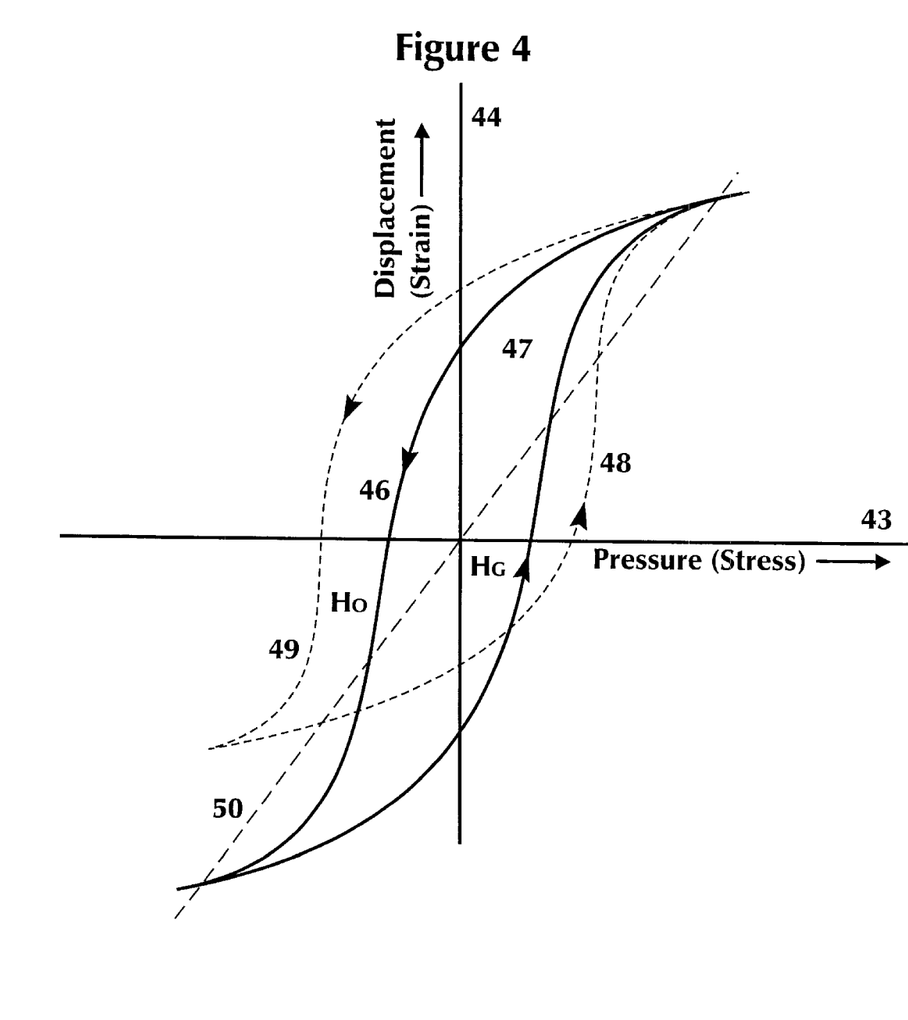
FIG. 4 illustrates the hysteretic behavior of the saturated rock due to seismic wave propagation during compression and rarefaction cycles; two different hysteretic behaviors of different viscosity pore fluids are shown.

FIG. 4 illustrates the hysteresis in viscoelastic rocks. It is associated with the pore fluids and the pore fluid motion during propagation of an oscillatory seismic wave through a porous and permeable reservoir rock. The ideal stress-strain relationship, which is linear, is shown as 50. In the real world case of hydrocarbon reservoir rocks, which are non-linear and hysteretic, the hysteresis curve does not follow a straight-line response when plotted on the stress (43) and strain (44) plot. The relation between pressure loading 45, and unloading 46, cycles of a propagating seismic wave becomes nonlinear and displays a lagging characteristic. The area of the hysteresis loop 47 represents the energy dissipated due to viscous friction. The hysteresis loop enclosed by 45 and 46, is identified as HG, and would typically represent the nonlinear behavior of the porous and permeable reservoir rock that has low viscosity pore fluid, like natural gas. The hysteresis loop enclosed by 48 and 49, identified as Ho, will represent the nonlinear behavior of porous and permeable rock that has higher viscosity pore fluid, like oil. The higher viscosity pore fluid, due to higher internal friction, has higher resistance to change in its current form. For this reason the shapes of the two hysteresis curves, HG and Ho, are different. Due to the cyclic nature of the propagating seismic wave, the unload cycle 49 of the hysteresis curve Ho, representing the higher viscosity pore fluid, shows that due to internal friction, the strain will not fully recover before the next load cycle will start. For this reason, the shape of the Ho hysteresis curve that represents the pore fluid behavior, is unsymmetrical for the positive and negative cycles of the cyclic seismic wave. Since the seismic wave transmission is a coupled motion between the rock frame and the pore fluids, the hysteretic behavior of the pore fluids due to their viscosity affects the total wave that is traveling through the saturated reservoir rock. It distorts the shape of the primary seismic signal that is propagating through the porous and permeable oil-saturated reservoir rock. The sinusoidal seismic wave, as it travels through the higher viscosity oil-saturated reservoir rock, gets deformed and becomes unsymmetrical. Even harmonics are generated and dominate the harmonic content in the reflected frequency spectrum, which represents the reflection response of the reservoir formation.

Figure 5:
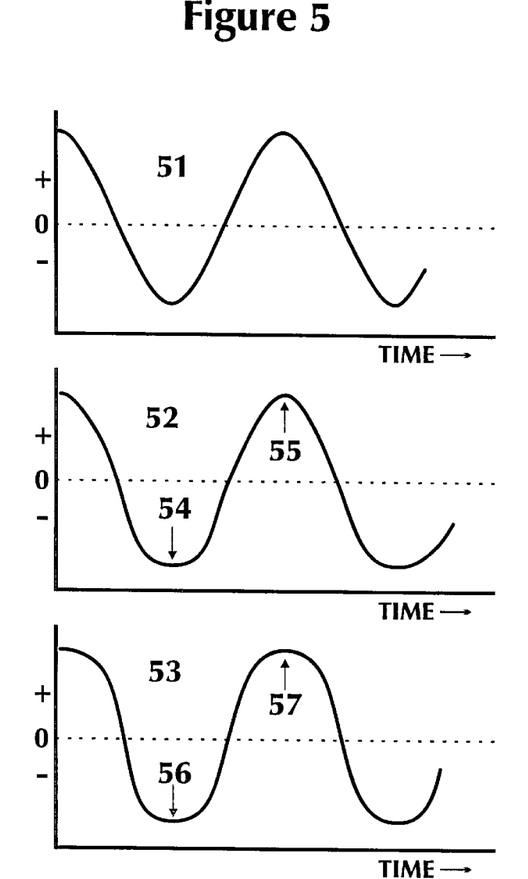
FIG. 5 illustrates the distortion in a pure sinusoidal signal caused by odd and even harmonics.

FIG. 5 illustrates the changes in the shape of a sinusoidal signal that is contaminated with odd or even harmonics. A pure sinusoidal signal is displayed as 51; it is symmetrical and the positive and negative going waveforms are identical. The signal 51 has been contaminated with 5% second and 2% fourth harmonics, and displayed as 52. Note the distortion as the shape of 54 and 55 differs and the waveform is not symmetrical. Again, the signal 51 has been contaminated with 5% third and 2% fifth harmonic, and displayed as 53. Note the distortion, shown as 56 and 57; it is symmetrical. This simple illustration shows that symmetrical distortion, at both negative and positive peaks of a sinusoidal seismic wave, are indicative of odd harmonics. When this distortion is unsymmetrical, the even harmonics will prevail.

This invention introduces a method of distinguishing pore fluids in the reservoir rocks. It uses a low-distortion, swept frequency seismic signal as a source for 2-D, 3-D or Borehole Seismic, to perform seismic reflection recording according to the current art. The cross-correlation of the recorded signal with the primary signal 31 is used for conventional seismic reflection processing for subsurface reflection imaging. Computer-generated sweeps, as shown in FIG. 3, are synthetically generated to represent the odd and even harmonics of the primary swept signal. The recorded seismic data is cross-correlated with each of the synthetic sweeps 32, 33, and 34 that represent second, third, and fourth harmonics. Each one of this data set that represents a particular harmonic, is processed using similar parameters that were used for the primary data set. The relative amplitudes of the reflected signals from the reservoir formations, using different data sets, which represent different harmonics are analyzed to determine the relative contribution of each harmonic. The predominance of the even harmonics in the reflected image of the reservoir formation is indicative of higher viscosity pore fluid, like oil. The predominance of the odd harmonics in the reflected image of the reservoir formation is indicative of lower-viscosity pore fluid, like natural gas.

Figure 6:
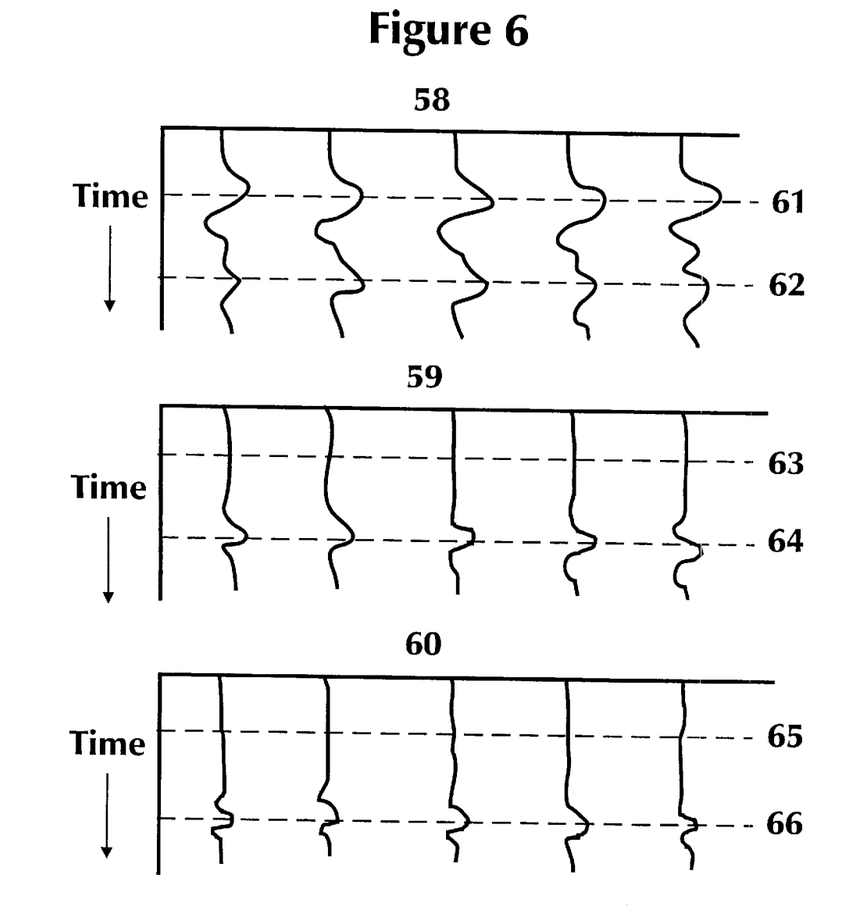
FIG. 6 illustrates a seismic reflection signal from the top interface and the bottom interface of a reservoir formation.

FIG. 6 illustrates the reflected signals from the upper and lower interface of the reservoir formation 19 (FIG. 1). The seismic reflection display 58 shows the data that have been cross-correlated with the primary sweep, 10 Hz to 50 Hz, shown as 31 in FIG. 2. The reflection 61 represents the reflected seismic signal 22 from the interface of formations 18 and 19 (FIG. 1). The reflected signal shown as 62 represents the reflected seismic signal 24, from the interface of formations 19 and 20 (FIG. 1).

The harmonics of the primary swept frequency signal 31 which are generated due to wave propagation through nonlinear reservoir rock formation are shown as 32, 33, and 34 in FIG. 2. These harmonics are generated because the seismic wave propagates through the elastically nonlinear reservoir rock 19; it travels through the rock formation 19 as 23 and is reflected as 24. The two-way transmission of the seismic wave through formation 19, which is porous, permeable and fluid-saturated, generates harmonics of the frequencies that are part of the primary wave swept frequency signal. So the cross-correlation of the data with 32 (FIG. 2), which is the second harmonic of the primary transmitted signal, will display the second harmonic content of the reflected energy. Similarly the third, fourth and fifth harmonic contents of the primary swept frequency signal can be separated from the reflection data volume and displayed individually.

The seismic reflection display 59 shows the data that have been cross-correlated with the second harmonic of the primary sweep, 20 Hz to 100 Hz, shown as 32 in FIG. 2. Note the absence of any coherent reflected signal displayed as 63, where previously there was a strong reflection at 61. This absence of signal at 63 is due to the fact that the harmonics are only being generated in the elastically nonlinear reservoir formation 19 (FIG. 1), which is porous and permeable, and there are no harmonics present when the seismic wave travels through the formation 18 and the formations above it, which are nonporous and homogeneous. The formations 18 and above have no porosity or permeability. They show higher order of elastic linearity and no harmonics are generated. The seismic reflection 64 represents the second harmonic content of the seismic signal, which is reflected from the lower interface of the reservoir formation 19 and 20 (FIG. 1).

The seismic reflection display 60 shows the data that is the result of cross-correlation with 33 (FIG. 2), which is the third harmonic of the primary swept frequency signal. There is absence of the reflection at 65, which is the interface of the formation 18 and 19, since there are no third harmonic frequencies, because the seismic wave has not penetrated any nonlinear rock. The reflection 66 shows the third harmonic component of the primary swept frequency signal, where the harmonics have been generated due to the, seismic wave propagation through the nonlinear reservoir rock. For time-lapse or 4-D seismic recording where seismic surveys are recorded at different time intervals to monitor the changes in the reservoir properties due to injection and production processes, the method described in this invention is ideal to map with higher accuracy, the distribution of the reservoir pore fluids and how they have changed over time. The relative amplitude measurements of the harmonics of the primary swept frequency signal (10 Hz–50 Hz) that was generated by the seismic source for the seismic 2-D or 3-D surveys are compared from one survey to the next survey, by using 'difference'imaging methods, that are known and currently being used in the seismic industry. The amplitudes of the reflections from the reservoir formation 62, 64 and 66 (FIG. 6), that represent different frequency contents, are compared from one seismic survey to the next. This comparison is made for the total 2-D or 3-D volume of the seismic data. By using 'difference'imaging, the differences in the amplitude of the odd and even harmonics of the reflections 62, 64 and 66, are displayed for the whole data volume that were recorded for each seismic survey. The increase in the amplitude of 64 (which is the second and an even harmonic) displayed on the certain portions of the 'difference'image that represents the whole processed seismic volume, indicates that a higher viscosity fluid has replaced a lower viscosity fluid in the parts of the reservoir which shows that the amplitude of 64 has increased in comparison with the previous survey. This could be interpreted as movement of water replacing the natural gas.

In the same manner, by using 'difference'imaging for reflection 66, which represents the third harmonic of the primary transmitted signal, the increase in the amplitude of 66 over certain parts of the reservoir can be displayed. Over the parts of the reservoir where we see that the amplitude of 66 has increased, there is an indication that the lower viscosity fluid has replaced the higher viscosity pore fluid. This could be interpreted as the gas replacing the oil.

For time-lapse seismic and 'difference'imaging, it is important that a reflection from a geologic marker located above the reservoir is used to calibrate the relative amplitudes of the reflections from one seismic survey to the next. Quite often the marine shale that was deposited over the area of interest, after the deposition of the reservoir formation, can be used as a geologic marker and its reflection amplitude used to normalize the data from different time-lapse seismic surveys. This normalization process helps in removing the amplitude differences that may be caused due to variations in the source and receiver sensitivity, from one survey to the next. The process of normalization of 4-D data is generally known and is being practiced in the industry.

As explained, this invention can determine the relative viscosity of the pore fluids in the reservoir by measuring the amplitude of the harmonics generated due to the elastic nonlinearity of the reservoir rocks. For time-lapse seismic or 4-D seismic, the changes in the relative amplitudes of the odd and even harmonics from one seismic survey to the next seismic survey will map the changes in the viscosity of the pore fluids. The integration of the information provided by this invention with the hydrocarbon production data of the reservoir, will image the fluid movement in the reservoir.

What is claimed is:

1. A method of determining and mapping the presence and the movement of the reservoir fluids that have different viscous properties, or mapping the changes in the viscous properties of the pore fluids in the reservoir rocks due to production and injection processes, comprising the steps of:
    (a) Using reflection seismic recording methods with a seismic vibratory source, that generates and transmits a low distortion seismic vibratory signal; this signal can be generated on the surface or in a wellbore, the reflected signals from the subsurface formations received by the surface receiver arrays, downhole receiver arrays or both and recorded using conventional seismic recording equipment;

(b) Recording 2-D, 3-D or borehole seismic reflection data using standard field recording procedures, cross-correlating with the primary transmitted vibratory swept frequency signal and processing the primary cross-correlated data-set to generate the primary subsurface reflected image, the subsurface image generated by using the current and generally known standard 2-D or 3-D seismic processing methods that are known in the industry, and are used for seismic reflection reservoir imaging;

(c) Using primary subsurface reflected image for conventional and standard structural interpretation of the reservoir, the methods of using different processing algorithms and interactive interpretation are known and practiced in the industry;

(d) Computer-generating the synthetic pilot swept frequency signals, these pilot signals representing the higher order harmonics of the primary swept frequency signal, like the second, third, fourth and fifth harmonics, all having the same amplitude as the primary transmitted sweep signal;

(e) Cross-correlating the recorded data with each of the synthetic harmonic frequency swept signals individually, thus making the number of cross-correlations that represent all the harmonics being investigated, thus generating a complete data set for each harmonic of the primary swept signal;

(f) Processing each of these harmonic data sets to generate the seismic reflection subsurface image, using the same 2-D or 3-D processing parameters that were used for the primary seismic reflection imaging, thus creating full volume seismic reflection subsurface images for each harmonic of the primary swept signal;

(g) Displaying the 2-D or 3-D images representing each of the harmonics being investigated, odd harmonic image highlighting the reservoir saturated with higher viscosity fluid, and even harmonic image highlighting the lower viscosity fluid in the reservoir.

2. The method in claim 1 further comprising:

Comparing the relative amplitudes of the reflections from the reservoir formation on each data volume (2-D or 3-D) that represents different harmonics of the primary swept frequency signal, a stronger odd harmonic reflected signal (third and fifth) from the reservoir formation is indicative of lower viscosity pore fluid like natural gas; a stronger even harmonic reflected signal (second and fourth), from the reservoir formation indicates higher viscosity pore fluid like oil.

3. The method in claim 1 further comprising the steps of:

(a) Recording the time-lapse seismic surveys using the same recording methods and parameters which were used on the first and earlier baseline seismic recording;

(b) Cross-correlating the time-lapse seismic survey data with the transmitted primary frequency sweep and its odd and even harmonics;

(c) Processing the primary cross-correlated data with identical processing parameters as done on the earlier base-line seismic survey;

(d) Processing the data which resulted after cross-correlation with the harmonics of the primary sweep using identical processing parameters as the primary cross-correlated data;

(e) Creating subsurface reservoir seismic reflection images that represent the primary frequency sweep signal and its odd and even harmonics.

4. The method in claim 1 further including the steps of:

(a) Displaying the seismic reflection subsurface images created by the primary frequency signal and its odd and even harmonics;

(b) Comparing these results to the results of the previous and earlier seismic survey by using 'difference' imaging between the seismic reflection subsurface images that correspond to the harmonics of the primary signal recorded at two different times;

(c) Identifying the reflections that represents the zone of interest in the reservoir formation on the time-lapsed processed seismic reflection image (time or depth);

(d) Mapping the changes in the amplitudes of these reflections corresponding to the odd ($3^{rd}$ and $5^{th}$) harmonics in the seismically mapped data volume, recorded at two different times;

(e) Mapping the changes in the amplitudes of these reflections corresponding to the even ($2^{nd}$ and $4^{th}$) harmonics in the seismically mapped data volume, recorded at two different times.

5. The method in claim 1 further comprising:

Interpreting the results of the signal differencing between the primary and the time-lapse survey; when the signal differencing indicates that over time there is an increase in the amplitude of the reflected signal from the reservoir formation that represents third harmonic or fifth harmonic or both, then it is indicative that lower viscosity fluid similar to natural gas has replaced higher viscosity fluid like oil, from that part of the reservoir formation that shows higher amplitude reflection signal;

When the signal differencing indicates that there is an increase over time in the reflection amplitude of the second harmonic, fourth harmonic or both, it is indicative that higher viscosity fluid has replaced the lower viscosity fluid, interpreted as oil or water replacing gas;

When there is no change it will indicate original fluids are still in place.

* * * * *